US012699272B2

(12) United States Patent
Lin

(10) Patent No.: US 12,699,272 B2
(45) Date of Patent: Aug. 4, 2026

(54) HEAD-MOUNTED DISPLAY

(71) Applicant: CHENG UEI PRECISION INDUSTRY CO., LTD., New Taipei City (TW)

(72) Inventor: Chin-Chung Lin, New Taipei City (TW)

(73) Assignee: CHENG UEI PRECISION INDUSTRY CO., LTD., New Taipei City (TW)

( * ) Notice: Subject to any disclaimer, the term of this patent is extended or adjusted under 35 U.S.C. 154(b) by 0 days.

(21) Appl. No.: 19/208,581

(22) Filed: May 14, 2025

(65) Prior Publication Data

US 2026/0153744 A1     Jun. 4, 2026

(30) Foreign Application Priority Data

Nov. 29, 2024    (CN) .......................... 202422948169.1

(51) Int. Cl.
*G02B 27/01* (2006.01)

(52) U.S. Cl.
CPC ..... *G02B 27/0176* (2013.01); *G02B 27/0179* (2013.01); *G02B 2027/0152* (2013.01); *G02B 2027/0154* (2013.01); *G02B 2027/0161* (2013.01); *G02B 2027/0169* (2013.01)

(58) Field of Classification Search
None
See application file for complete search history.

(56) References Cited

U.S. PATENT DOCUMENTS

| | | | | |
|---|---|---|---|---|
| 11,846,752 B1* | 12/2023 | Chang | ................ | G02B 27/0176 |
| 2012/0162764 A1* | 6/2012 | Shimizu | ............. | G02B 27/0176 |
| | | | | 359/473 |
| 2018/0338130 A1* | 11/2018 | Miller | ................. | H04N 13/327 |
| 2020/0310137 A1* | 10/2020 | Lan | ....................... | F16M 11/043 |
| 2021/0041697 A1* | 2/2021 | Rong | ....................... | G02B 7/12 |
| 2021/0208364 A1* | 7/2021 | Chen | ........................ | G02B 7/12 |
| 2024/0077696 A1* | 3/2024 | Huang | .................. | G02B 7/023 |

* cited by examiner

*Primary Examiner* — Christopher J Kohlman
(74) *Attorney, Agent, or Firm* — Cheng-Ju Chiang

(57) ABSTRACT

A head-mounted display includes a housing, a bracket, a first sliding plate, a first display unit, a second sliding plate, a second display unit, an adjustment gear and a limiting elasticity piece. The housing has a receiving space. The bracket is disposed in the receiving space. The first sliding plate is slidably disposed to one side of the bracket. The first sliding plate has a first rack. The first display unit is mounted on the first sliding plate. The second sliding plate is slidably disposed to the other side of the bracket. The second sliding plate has a second rack. The second display unit is mounted on the second sliding plate. The adjustment gear is rotatably disposed at the bracket. The first rack and the second rack are both engaged with the adjustment gear. The limiting elasticity piece is mounted to an inner surface of the housing.

14 Claims, 10 Drawing Sheets

HEAD-MOUNTED DISPLAY

CROSS REFERENCE TO RELATED APPLICATIONS

The present application is based on, and claims priority from, China Patent Application No. 202422948169.1, filed Nov. 29, 2024, the disclosure of which is hereby incorporated by reference herein in its entirety.

BACKGROUND OF THE INVENTION

Field of the Invention

The present invention generally relates to a head-mounted display, and more particularly to a head-mounted display having an interpupillary distance adjustment device and an excellent wearing stability.

Description of Related Art

Generally, head-mounted displays may be applied in technologies of Virtual Reality (VR), Augmented Reality (AR), and Mixed Reality (MR), etc. The Virtual Reality constructs a highly realistic 3D virtual world through computer simulation way. The Augmented Reality projects virtual elements into the real world by use of a projection or a camera combination. The technology of the Mixed Reality combines both the technology of the Virtual Reality and the technology of the Augmented Reality.

With the advancements of sciences and technologies, applications of head-mounted displays in a medicine field, a military field, an entertainment field, an education field and other fields are becoming increasingly widespread. Because interpupillary distances of users are different, so the head-mounted displays typically have interpupillary distance adjustment functions to provide better visual effects for the users.

For instance, an interpupillary distance adjustment mechanism includes a bracket, a first housing and a second housing movably disposed to the bracket, and an adjustment gear rotatably connected to the bracket. The adjustment gear is positioned between the first housing and the second housing. One side of the first housing extends sideward to form a first elongated tooth section, and one side of the second housing extends sideward to form a second elongated tooth section. The first elongated tooth section and the second elongated tooth section are disposed face to face, and the first elongated tooth section and the second elongated tooth section are respectively engaged with the adjustment gear. The first housing is configured to install a first optical component, and the second housing is configured to install a second optical component. The adjustment gear rotates to drive the first housing and the second housing to move relative to each other, so a relative distance between the first optical component and the second optical component is adjusted to cooperate with the interpupillary distance of the user.

However, in this structural design, the adjustment gear, the first elongated tooth section and the second elongated tooth section lack a limiting structure, so the adjustment gear is prone to be affected by external forces to cause an unintended rotation, and unintended movements of the first elongated tooth section and the second elongated tooth section are caused. Correspondingly, though the relative distance between the first optical component and the second optical component is adjusted to cooperate with the interpupillary distance of the user, a displacement of the first optical component and the second optical component is caused. As a result, an inconvenience is caused in use.

In view of the above-mentioned shortcomings, it is essential to provide a head-mounted display having an interpupillary distance adjustment device and an excellent wearing stability.

BRIEF SUMMARY OF THE INVENTION

An object of the present invention is to provide a head-mounted display, comprising: a housing, an inside of the housing having a receiving space penetrating through a rear of the housing; a bracket disposed in the receiving space; a first sliding plate slidably disposed to one side of the bracket, the first sliding plate having a first rack extended sideward from one side of the first sliding plate, several portions of a surface of the first sliding plate being recessed inward to form a plurality of limiting grooves abreast arranged transversely; a first display unit mounted on the first sliding plate, and the first display unit moving together with the first sliding plate; a second sliding plate slidably disposed to the other side of the bracket, and the second sliding plate being located to one side of the first sliding plate, the second sliding plate having a second rack extended sideward and towards the first sliding plate from one side of the second sliding plate, the first rack and the second rack being parallel to each other; a second display unit mounted on the second sliding plate, and the second display unit moving together with the second sliding plate; an adjustment gear rotatably disposed at the bracket, and the adjustment gear being connected between the first sliding plate and the second sliding plate, the first rack and the second rack being both engaged with the adjustment gear; and a limiting elasticity piece mounted to an inner surface of the housing, the plurality of the limiting grooves facing the limiting elasticity piece, a middle of the limiting elasticity piece being arched towards the first sliding plate to form a limiting block, and the limiting block being buckled in one of the plurality of the limiting grooves.

Another object of the present invention is to provide a head-mounted display, comprising: a housing having a receiving space; a bracket disposed in the receiving space; a first sliding plate slidably disposed to one side of the bracket, the first sliding plate having a first rack; a first display unit mounted to the first sliding plate, and the first display unit moving together with the first sliding plate; a second sliding plate slidably disposed to the other side of the bracket, the second sliding plate having a second rack, the first rack and the second rack being parallel to each other; a second display unit mounted to the second sliding plate, and the second display unit moving together with the second sliding plate; an adjustment gear rotatably disposed at the bracket, and the adjustment gear being connected between the first rack and the second rack; and wherein a plurality of limiting grooves are formed on one of the first sliding plate and the second sliding plate; and wherein a limiting elasticity piece is mounted to the housing, the plurality of the limiting grooves face the limiting elasticity piece, the limiting elasticity piece has a limiting block, and the limiting block is buckled in one of the plurality of the limiting grooves; and wherein the adjustment gear rotates to drive the first rack and the second rack to move closer to each other or break away from each other, so that the first sliding plate and the second sliding plate move closer to each other or break away from each other.

Another object of the present invention is to provide a head-mounted display, comprising: a housing having a receiving space, a top wall of the housing defining an adjusting groove, the receiving space being communicated with the adjusting groove; a bracket disposed in the receiving space; a first sliding plate slidably disposed to one side of the bracket, the first sliding plate having a first rack; a first display unit mounted on the first sliding plate, and the first display unit moving together with the first sliding plate; a second sliding plate slidably disposed to the other side of the bracket, the second sliding plate having a second rack, the first rack and the second rack being parallel to each other; a second display unit mounted on the second sliding plate, and the second display unit moving together with the second sliding plate; an adjustment gear rotatably disposed at the bracket, and the adjustment gear being connected between the first rack and the second rack; and wherein an adjusting lever is extended from one of the first sliding plate and the second sliding plate, and the adjusting lever passes through the adjusting groove, and the adjusting lever is exposed to a top surface of the housing; and wherein a fixation structure is positioned between the housing and one of the first sliding plate and the second sliding plate; and wherein the fixation structure has a plurality of limiting grooves and a limiting elasticity piece, the plurality of the limiting grooves face the limiting elasticity piece, the limiting elasticity piece has a limiting block, and the limiting block is buckled in one of the plurality of the limiting grooves.

As described above, the head-mounted display is equipped with the interpupillary distance adjustment device which includes the first sliding plate and the second sliding plate slidably disposed at the bracket, respectively, and the first display unit and the second display unit are respectively installed to the first sliding plate and the second sliding plate, respectively. Furthermore, the first sliding plate has the first rack, and the second sliding plate has the second rack, the first rack and the second rack are parallel to each other, and the first rack and the second rack are engaged with the adjustment gear which is mounted to the bracket, the adjusting lever is stirred to generate a rotation of the adjustment gear, so that the first rack and the second rack are driven to move closer to each other or break away from each other, and the first sliding plate and the second sliding plate move closer to each other or break away from each other, in this way, a distance between the first display unit and the second display unit is adjusted according to an interpupillary distance of a user, and a better visual effect is provided for the user. Additionally, the limiting block is blocked in the one of the plurality of the limiting grooves to prevent a displacement of the first sliding plate and the second sliding plate to enhance a wearing stability of the head-mounted display, so the head-mounted display has an excellent wearing stability.

BRIEF DESCRIPTION OF THE DRAWINGS

The present invention will be apparent to those skilled in the art by reading the following description, with reference to the attached drawings, in which.

DETAILED DESCRIPTION OF THE INVENTION

Figure 1:
FIG. 1 is a perspective view of a head-mounted display according to the present invention.
Figure 1:
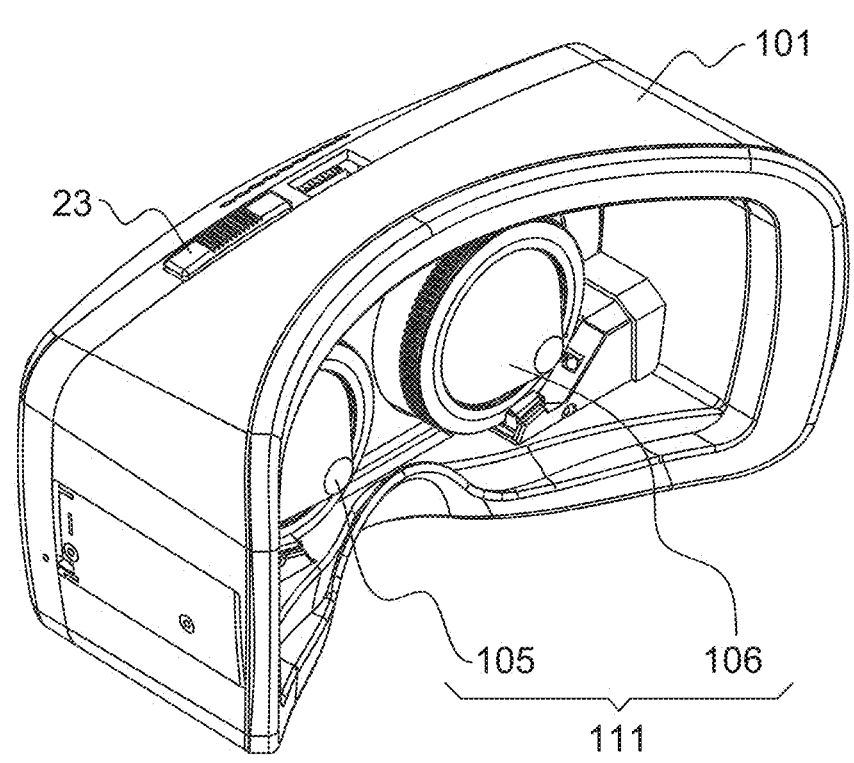
Figure 2:
FIG. 2 is an exploded view of the head-mounted display according to the present invention.
Figure 2:
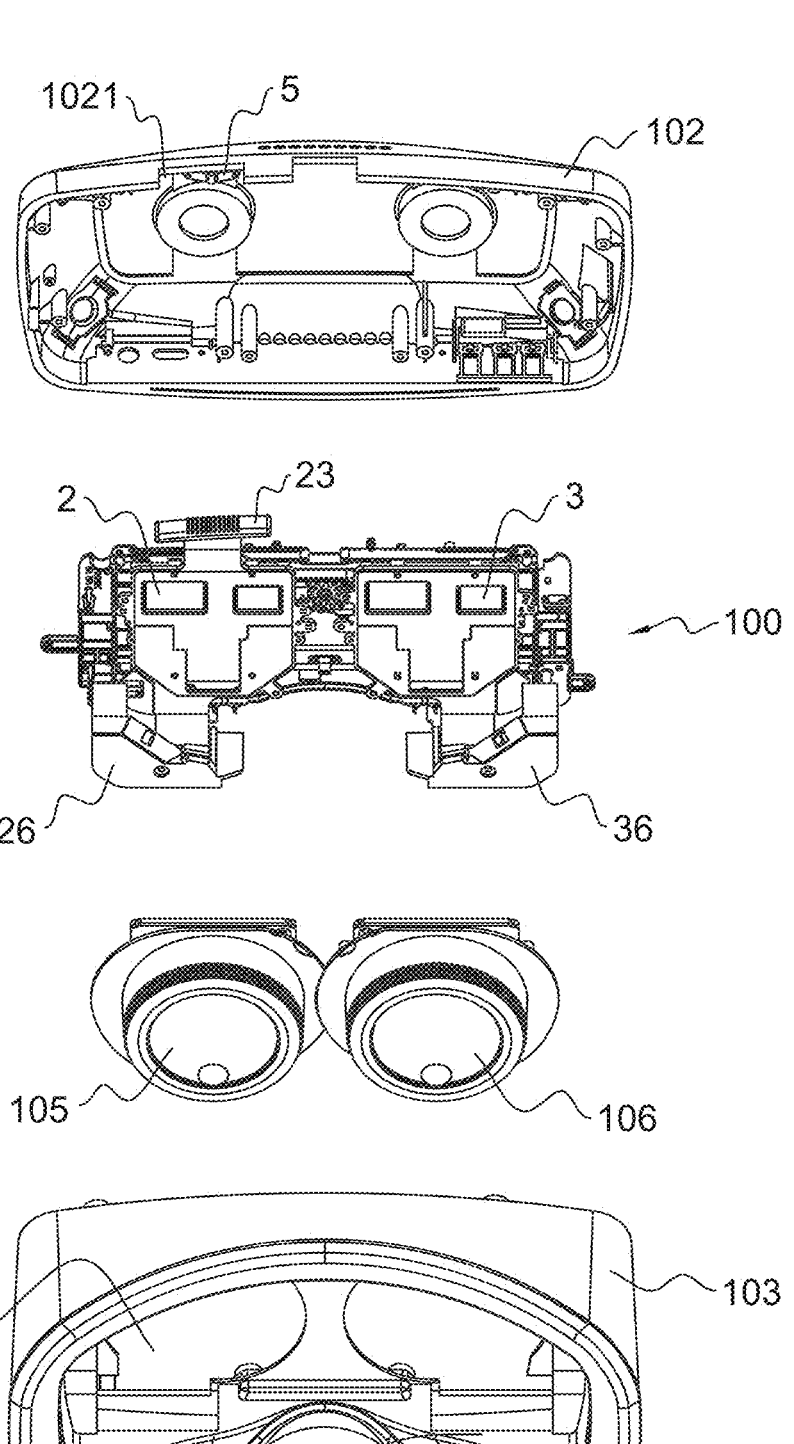
Figure 3:
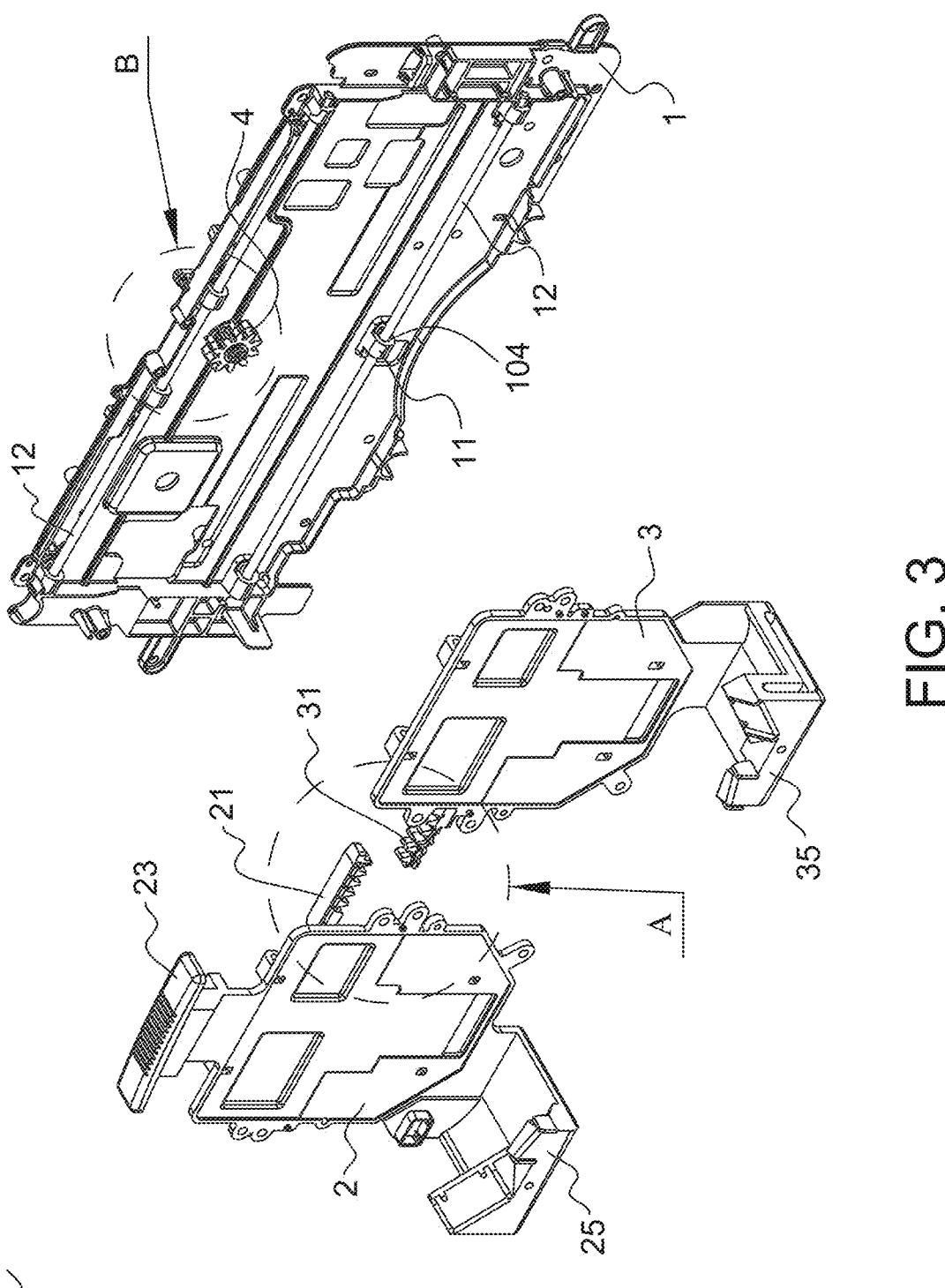
FIG. 3 is an exploded view of an interpupillary distance adjustment device of the head-mounted display according to the present invention.
Figure 4:
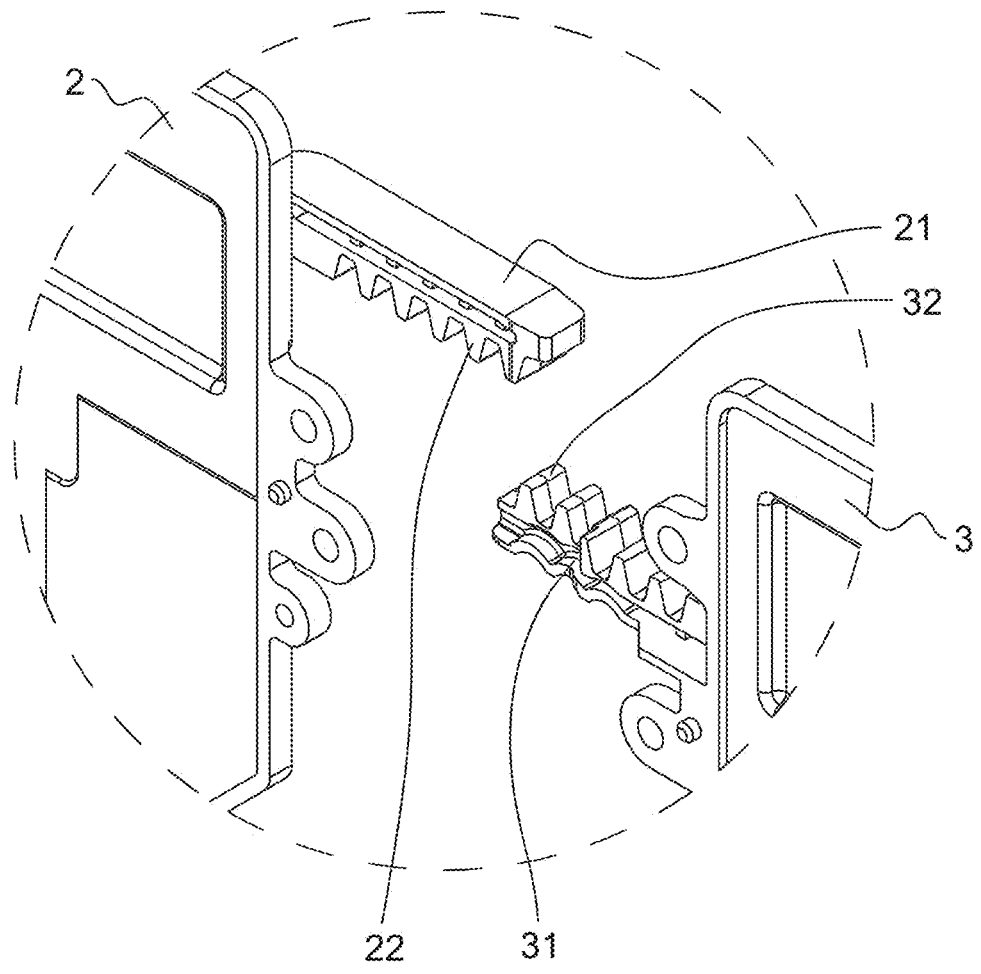
FIG. 4 is an enlarged view of an encircled portion A of the head-mounted display of FIG. 3.
Figure 5:
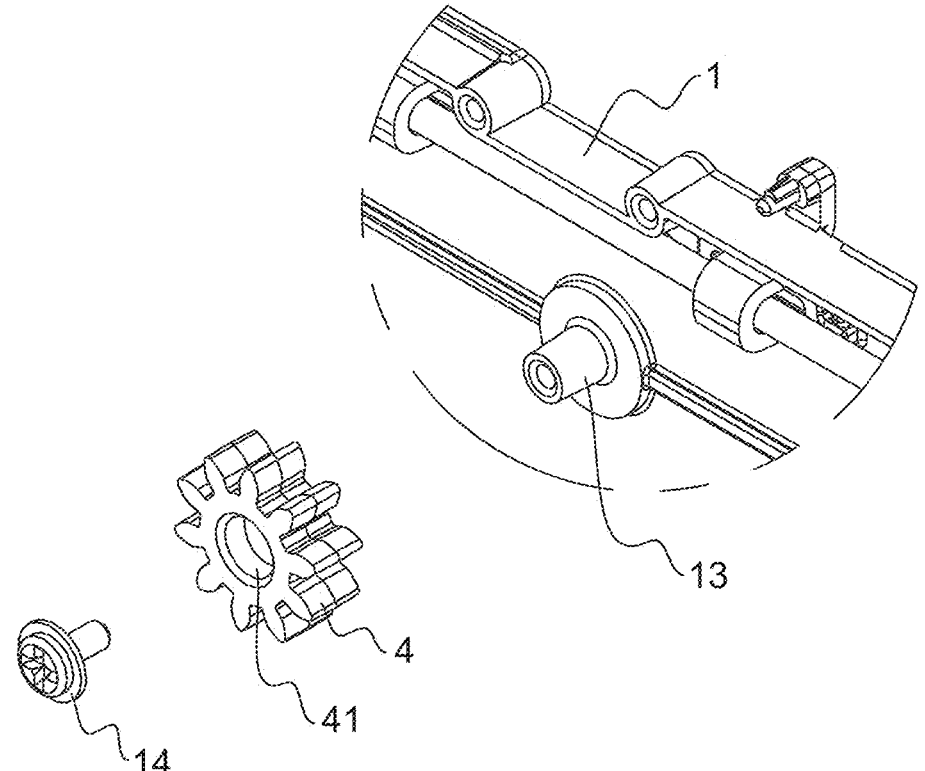
FIG. 5 is an exploded view of an encircled portion B of the head-mounted display of FIG. 3.
Figure 6:
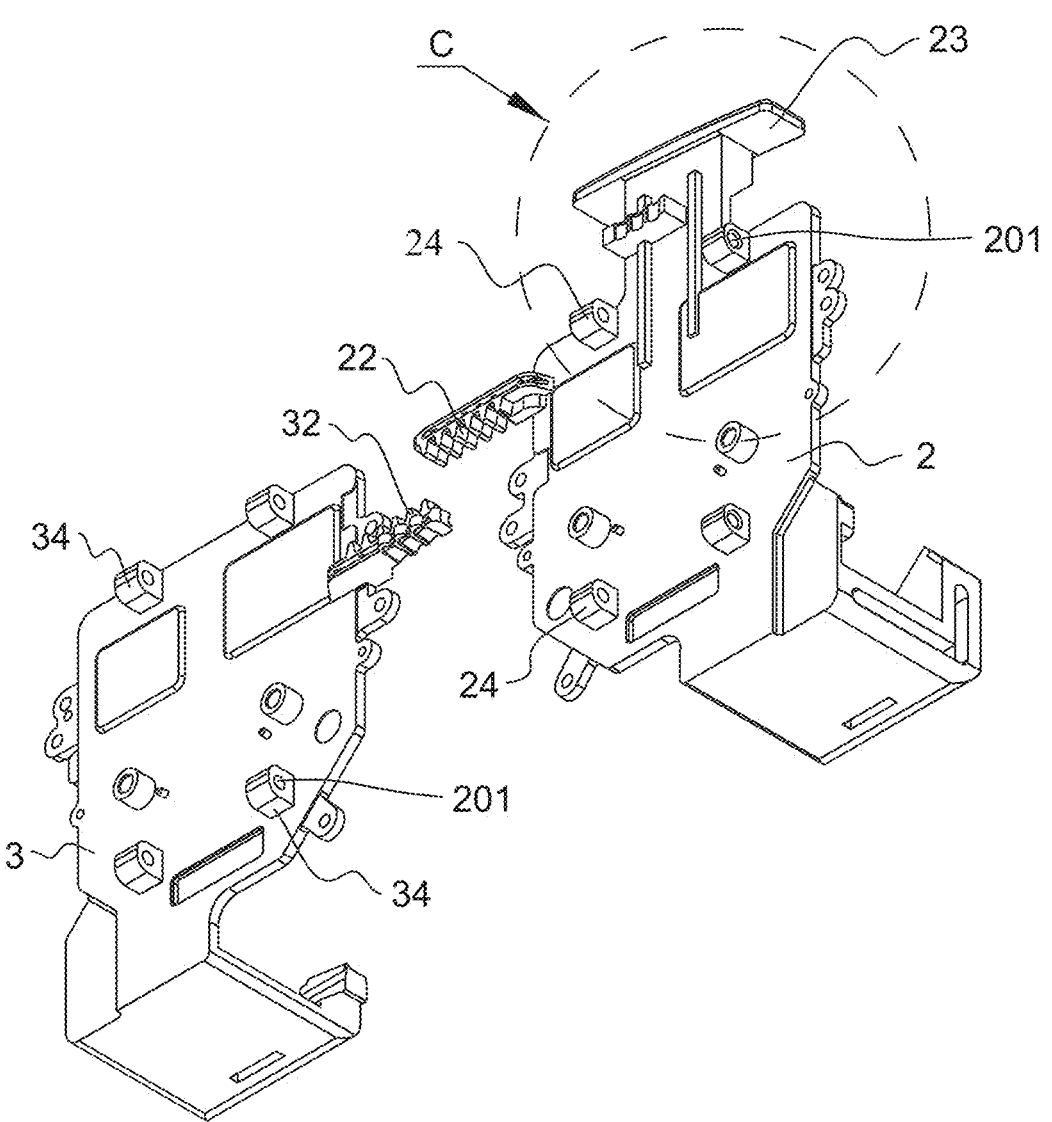
FIG. 6 is a perspective view of a first sliding plate and a second sliding plate of the head-mounted display according to the present invention.
Figure 7:
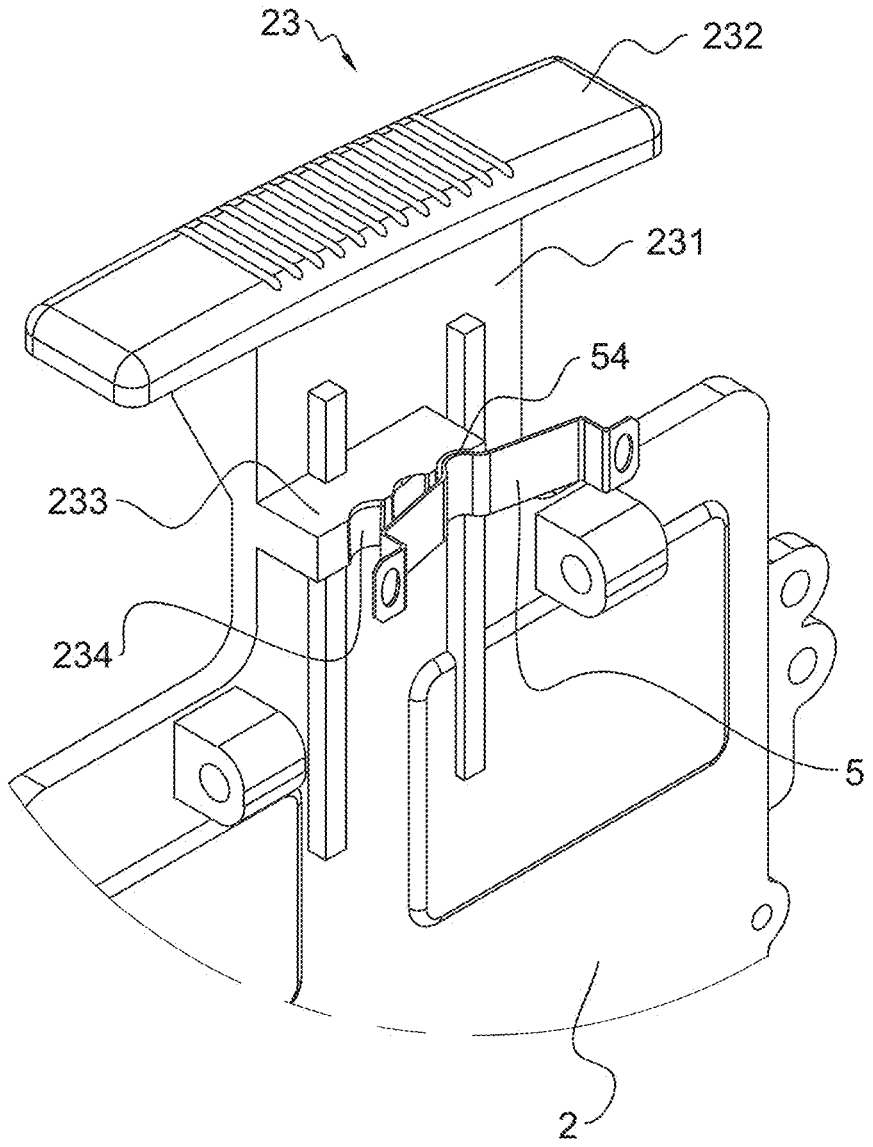
FIG. 7 is an enlarged view of an encircled portion C of the head-mounted display shown in FIG. 6, wherein the first sliding plate is combined with a limiting elasticity piece of the head-mounted display according to the present invention.
Figure 8:
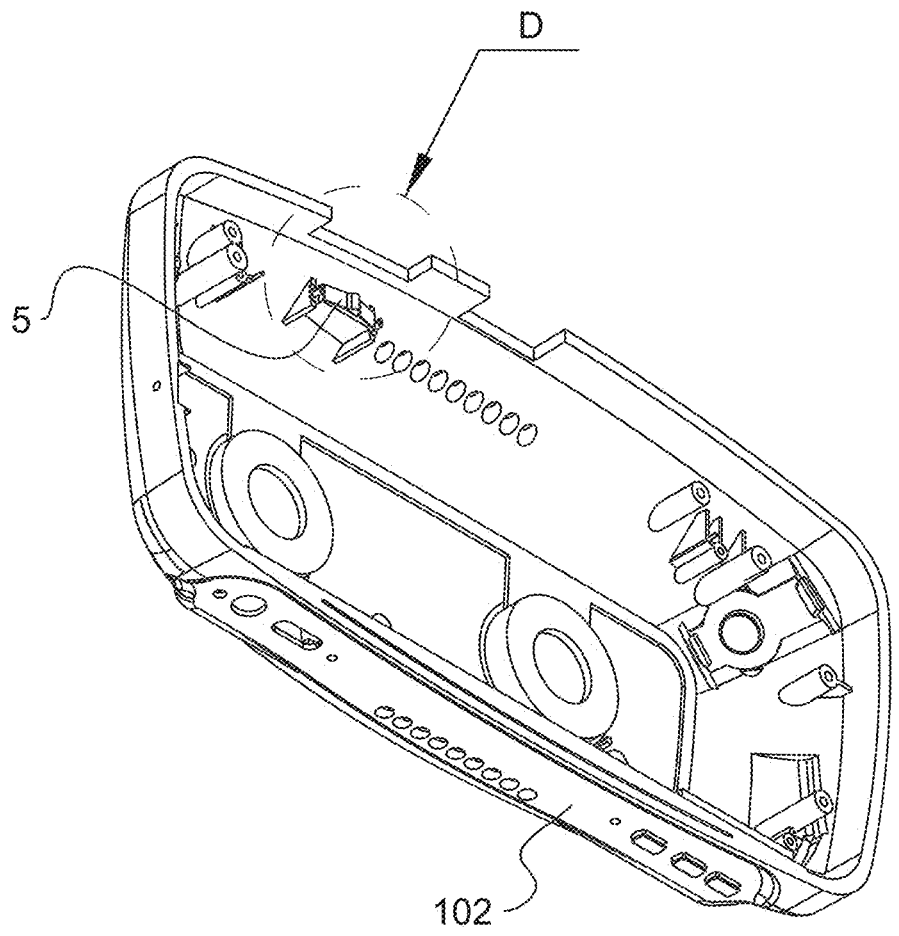
FIG. 8 is a partially perspective view of the head-mounted display, wherein the limiting elasticity piece is combined with a housing of the head-mounted display according to the present invention.
Figure 9:
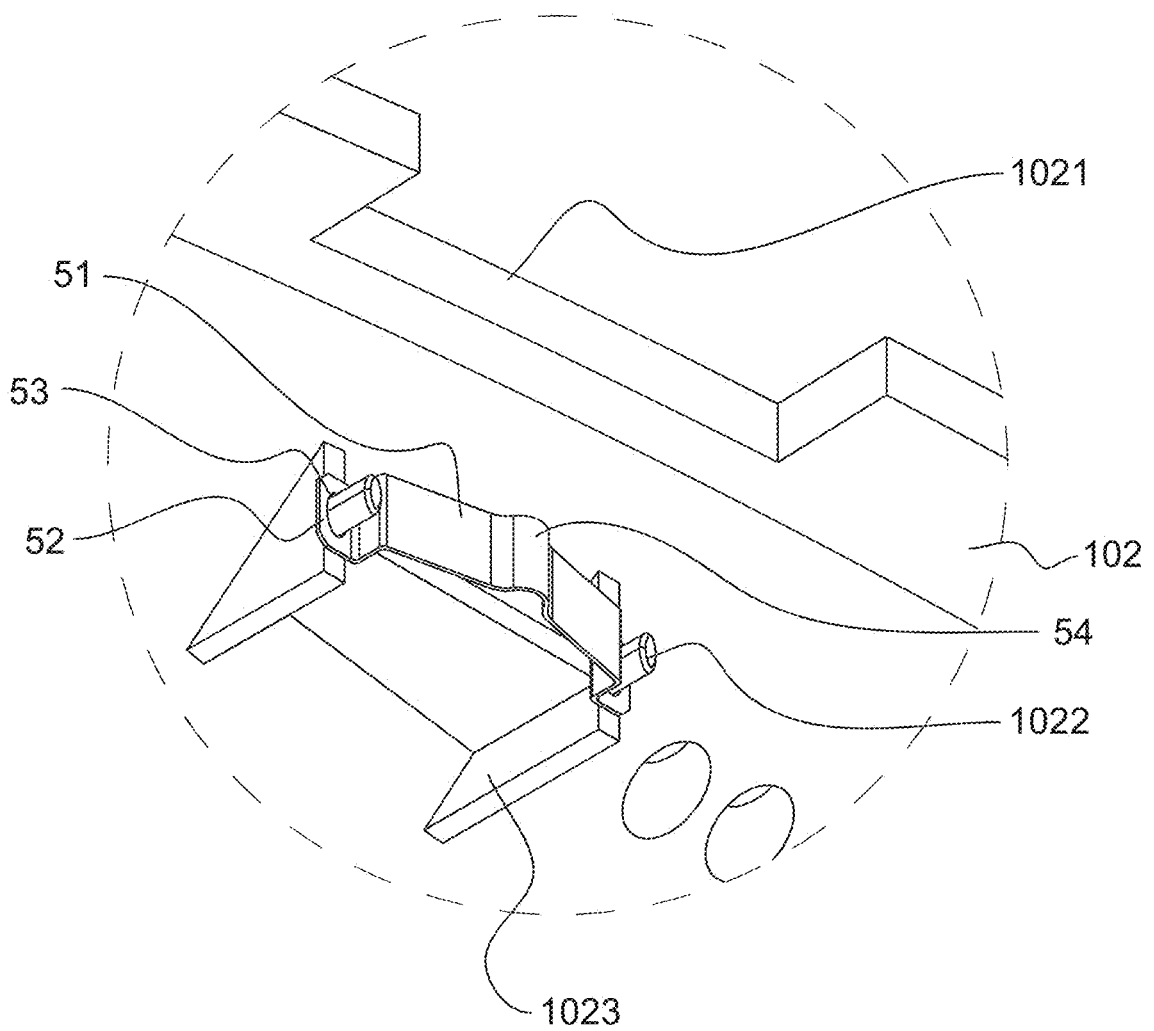
FIG. 9 is an enlarged view of an encircled portion D of the head-mounted display of FIG. 8.
Figure 10:
FIG. 10 is a partially exploded view of the head-mounted display according to the present invention.
Figure 10:
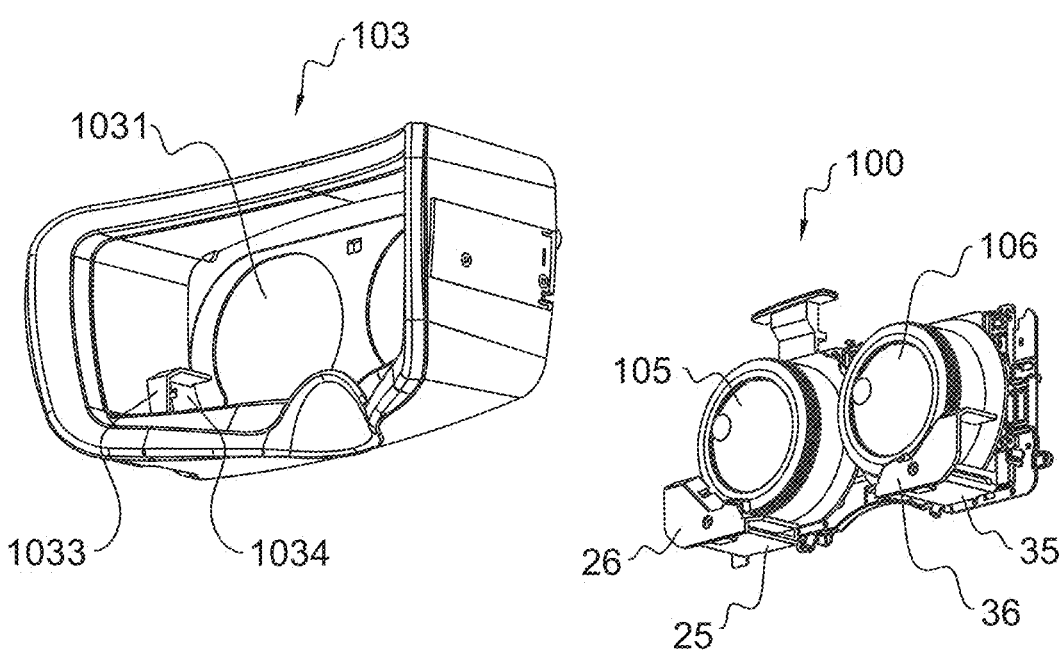

Referring to FIG. 1 and FIG. 2, a head-mounted display 10 includes a housing 101, a display module 111 received in the housing 101, and an interpupillary distance adjustment device 100 received in the housing 101. The head-mounted display 10 is designed to be worn on a head of a user. The display module 111 is correspondingly positioned in front of eyes of the user. The interpupillary distance adjustment device 100 is configured to adjust a spacing of the display module 111 to provide an optimal visual effect for the user.

Referring to FIG. 1 to FIG. 4, an inside of the housing 101 has a receiving space 110 penetrating through a rear of the housing 101. The housing 101 includes a casing 102, and a cover 103 combined with the casing 102. The casing 102 and the cover 103 are able to be fastened together by use of screw elements. The cover 103 is covered to the casing 102 to define the receiving space 110 between the cover 103 and the casing 102 to accommodate the display module 111 and the interpupillary distance adjustment device 100.

The interpupillary distance adjustment device 100 includes a bracket 1, a first sliding plate 2, a second sliding plate 3, an adjustment gear 4 and a limiting elasticity piece 5. The bracket 1 is installed in the housing 101. The bracket 1 is disposed in the receiving space 110. The first sliding plate 2 and the second sliding plate 3 are slidably disposed at two sides of the bracket 1, respectively. The first sliding plate 2 is slidably disposed to one side of the bracket 1. The second sliding plate 3 is slidably disposed to the other side of the bracket 1, and the second sliding plate 3 is located to one side of the first sliding plate 2. Specifically, the first sliding plate 2 and the second sliding plate 3 are slidably disposed at a left side and a right side of the bracket 1, respectively. The adjustment gear 4 is rotatably disposed at the bracket 1, and the adjustment gear 4 is connected between the first sliding plate 2 and the second sliding plate 3. The first sliding plate 2 has a first rack 22, and the second sliding plate 3 has a second rack 32. The first rack 22 is extended sideward from one side of the first sliding plate 2. The second rack 32 is extended sideward and towards the first sliding plate 2 from one side of the second sliding plate 3. The first rack 22 and the second rack 32 are parallel to each other, and the first rack 22 and the second rack 32 are both engaged with the adjustment gear 4 which is mounted to the bracket 1. The limiting elasticity piece 5 is mounted to an inner surface of the housing 101.

The adjustment gear 4 rotates to drive the first rack 22 and the second rack 32 to move closer to each other or break away from each other, so that the first sliding plate 2 and the second sliding plate 3 move closer to each other or break away from each other. The display module 111 includes a first display unit 105 and a second display unit 106. The first display unit 105 and the second display unit 106 are respectively installed to the first sliding plate 2 and the second sliding plate 3, respectively. The first display unit 105 is mounted on the first sliding plate 2, and the first display unit 105 moves together with the first sliding plate 2. The second display unit 106 is mounted on the second sliding plate 3, and the second display unit 106 moves together with the second sliding plate 3.

Referring to FIG. 1 to FIG. 7, the interpupillary distance adjustment device 100 adjusts a distance between the first display unit 105 and the second display unit 106 according to an interpupillary distance of the user. Additionally, the limiting elasticity piece 5 is mounted at an inner wall of the casing 102. A middle of the limiting elasticity piece 5 is arched towards the first sliding plate 2 to form a limiting block 54. Several portions of a surface of the first sliding plate 2 are recessed inward to form a plurality of limiting grooves 234. The plurality of the limiting grooves 234 face the limiting elasticity piece 5. The plurality of the limiting grooves 234 are abreast arranged transversely. The plurality of the limiting grooves 234 are arranged to alternately corresponding to the limiting block 54, and the limiting block 54 is buckled in one of the plurality of the limiting grooves 234, so that a movement of the first sliding plate 2 and a movement of the second sliding plate 3 are limited, and a stability of wearing the head-mounted display 10 is improved.

Referring to FIG. 1 to FIG. 7, a top wall of the housing 101 defines an adjusting groove 1021 penetrating through the top wall of the housing 101 along an up-down direction. A rear surface of a top wall of the casing 102 is recessed inward to form the adjusting groove 1021. A top of the first sliding plate 2 extends upward to form an adjusting lever 23. The adjusting lever 23 passes through the adjusting groove 1021 and the adjusting lever 23 is exposed to a top surface of the housing 101, specifically, the adjusting lever 23 is exposed to a top surface of the casing 102, so that the user conveniently slides the adjusting lever 23 to generate a relative movement between the first sliding plate 2 and the second sliding plate 3. The adjusting lever 23 is stirred to generate a rotation of the adjustment gear 4, so that the first rack 22 and the second rack 32 are driven to move closer to each other or break away from each other, and the first sliding plate 2 and the second sliding plate 3 move closer to each other or break away from each other.

The adjusting lever 23 includes an extension plate 231 and a sliding portion 232. The top of the first sliding plate 2 extends towards the adjusting groove 1021 to form the extension plate 231. A top end of the extension plate 231 extends upward and expands outward to form the sliding portion 232. A width of the sliding portion 232 is greater than a width of the adjusting groove 1021. The sliding portion 232 is positioned outside the adjusting groove 1021, so that the user slides the sliding portion 232 conveniently.

Referring to FIG. 1 to FIG. 9, in order to prevent the first sliding plate 2 and the second sliding plate 3 of which positions are adjusted from shifting, the adjusting lever 23 is provided with a limiting part 233 and the plurality of the limiting grooves 234. A front surface of the first sliding plate 2 extends frontward to form the limiting part 233. The limiting part 233 is extended frontward from a front surface of the extension plate 231, and the limiting part 233 faces the limiting elasticity piece 5. Several portions of a front surface of the limiting part 233 are recessed inward to form the plurality of the limiting grooves 234 arranged side by side. Two portions of the inner surface of the housing 101 extend inward to form a pair of fixing parts 1022. Two portions of the inner side wall of the casing 102 extend inward to form the pair of the fixing parts 1022. Each fixing part 1022 is shown as a columnar structure. The pair of the fixing parts 1022 are combined with both sides of the limiting elasticity piece 5, and the limiting elasticity piece 5 is aligned with the limiting part 233. The inner surface of the housing 101 extends inward to form a rib 1023.

Preferably, the casing 102 has the rib 1023. The inner side wall of the casing 102 extends inward to form the rib 1023. The pair of the fixing parts 1022 are disposed at two opposite sides of the rib 1023. Two inner surfaces of the two opposite sides of the rib 1023 extend inward to form the pair of the fixing parts 1022. The limiting elasticity piece 5 includes an elastic cantilever 51, a pair of fixing legs 52, a pair of fixing holes 53 and the limiting block 54. Two outer sides of the elastic cantilever 51 are perpendicularly bent towards the inner surface of the housing 101 and then extend outward to form the pair of the fixing legs 52. The pair of the fixing holes 53 longitudinally penetrate through the pair of fixing legs 52, respectively.

The pair of the fixing legs 52 are combined with the inner surface of the housing 101 to hang the elastic cantilever 51 beside the inner surface of the housing 101. A middle of the elastic cantilever 51 is bulged away from the inner surface of the housing 101 to form the limiting block 54. The pair of the fixing parts 1022 pass through the pair of the fixing holes 53, and the pair of the fixing legs 52 are combined with the pair of the fixing parts 1022 by a thermal melting way, so that the elastic cantilever 51 is spaced from the casing 102, and the elastic cantilever 51 is suspended in midair. A central portion of the elastic cantilever 51 is bulged away from the rib 1023 to form the limiting block 54. The limiting block 54 is limited in the one of the plurality of the limiting grooves 234.

During a process of moving the adjusting lever 23 to generate a displacement of the first sliding plate 2, the limiting part 233 pushes against the limiting block 54 laterally. At the moment, the elastic cantilever 51 elastically deforms in a direction towards the inner side wall of the casing 102, so that the limiting part 233 passes through the limiting block 54 without a sliding interference affection. When the user stops applying a force to the adjusting lever 23, the limiting block 54 rebounds and resets in a direction towards the limiting part 233, and the limiting block 54 is blocked in the one of the plurality of the limiting grooves 234, so that a location between the first sliding plate 2 and the second sliding plate 3 is realized, and a fixation between the first sliding plate 2 and the second sliding plate 3 is realized.

Referring to FIG. 3 to FIG. 8, the first sliding plate 2 has a first adjustment belt 21. An inner wall of the first sliding plate 2 extends sideward and towards the second sliding plate 3 to form the first adjustment belt 21. A bottom of the first adjustment belt 21 protrudes downward to form the first rack 22. The second sliding plate 3 has a second adjustment belt 31. An inner wall of the second sliding plate 3 extends sideward and towards the first sliding plate 2 to form the second adjustment belt 31. A top of the second adjustment belt 31 protrudes upward to form the second rack 32. Preferably, the first rack 22 is formed at a bottom surface of the first adjustment belt 21. The first rack 22 is meshed with a top of the adjustment gear 4. The second rack 32 is formed at a top surface of the second adjustment belt 31. The second rack 32 is meshed with a bottom of the adjustment gear 4.

Referring to FIG. 2 to FIG. 7, when the user moves the sliding portion 232, a displacement of the first rack 22 of the first sliding plate 2 drives the adjustment gear 4 to rotate, and the adjustment gear 4 brings along the second rack 32 to move relatively, so that a distance between the first display unit 105 mounted on the first sliding plate 2 and the second display unit 106 mounted on the second sliding plate 3 is adjusted. When the user pushes the sliding portion 232 outward, the first sliding plate 2 slides outward to make the first rack 22 move away from the second sliding plate 3, and the adjustment gear 4 is driven to rotate counterclockwise. Simultaneously, the second rack 32 moves away from the first sliding plate 2 with the rotation of the adjustment gear 4, so that the distance between the first display unit 105 and the second display unit 106 is increased.

Conversely, when the user pushes the sliding portion 232 inward, the first sliding plate 2 slides inward to make the first rack 22 move towards the second sliding plate 3, and the adjustment gear 4 is driven to rotate clockwise. Simultaneously, the second rack 32 moves towards the first sliding plate 2 with the rotation of the adjustment gear 4, so that the distance between the first display unit 105 and the second display unit 106 is decreased. After the distance between the first sliding plate 2 and the second sliding plate 3 is adjusted, positions of the limiting block 54 and the plurality of the limiting grooves 234 are effectively limited, so that the first sliding plate 2 and the second sliding plate 3 are prevented from shifting.

Referring to FIG. 2 to FIG. 9, the bracket 1 includes a plurality of slide rail seats 11, two parallel slide rails 12, a gear seat 13 and a locking element 14. The plurality of the slide rail seats 11 are protruded outwardly from a rear surface of the bracket 1. The plurality of the slide rail seats 11 are formed as semi-cylindrical structures. Insides of the plurality of the slide rail seats 11 define a plurality of penetrating holes 104. The two slide rails 12 are designed as straight rods. The two slide rails 12 are fastened to the plurality of the slide rail seats 11. The two slide rails 12 pass through the penetrating holes 104 of the plurality of the slide rail seats 11. Two opposite ends of each slide rail 12 abut against two outer side walls of the bracket 1, so that the two slide rails 12 are fastened to the bracket 1. The two slide rails 12 are arranged parallel to each other, and the two slide rails 12 are mounted at an upper end and a lower end of the bracket 1.

The first sliding plate 2 and the second sliding plate 3 are assembled to the two slide rails 12, and the first sliding plate 2 and the second sliding plate 3 are slidable along the two slide rails 12, so that the first display unit 105 and the second display unit 106 are able to stably slide along the two parallel slide rails 12. The rear surface of the bracket 1 protrudes outward to form the gear seat 13, and the gear seat 13 is located between the first sliding plate 2 and the second sliding plate 3. The adjustment gear 4 is rotatably mounted around the gear seat 13. The gear seat 13 is a hollow shaft structure. A center of the adjustment gear 4 has a through hole 41 longitudinally penetrating through the adjustment gear 4. The gear seat 13 passes through the through hole 41. The locking element 14 passes through the through hole 41, and the locking element 14 is locked into the gear seat 13, so that the adjustment gear 4 is rotatably mounted at the bracket 1.

Referring to FIG. 1 to FIG. 10, in order to slidably connect the first sliding plate 2 and the second sliding plate 3 to the bracket 1, several portions of the front surface of the first sliding plate 2 protrude frontward to form a plurality of first pivoting parts 24, and several portions of a front surface of the second sliding plate 3 protrude frontward to form a plurality of second pivoting parts 34. Each first pivoting part 24 and each second pivoting part 34 are designed as arcuation structures. Insides of the plurality of the first pivoting parts 24 and the second pivoting parts 34 define a plurality of perforations 201 transversely penetrating through the plurality of the first pivoting parts 24 and the second pivoting parts 34, so that the plurality of the first pivoting parts 24 and the second pivoting parts 34 are mounted around the two slide rails 12.

Preferably, a quantity of the plurality of the first pivoting parts 24 is four, and a quantity of the plurality of the second pivoting parts 34 is four. The plurality of the first pivoting parts 24 and the second pivoting parts 34 are arranged to an upper row and a lower row. The upper row of the first pivoting parts 24 and the upper row of the second pivoting parts 34 are aligned, and the lower row of the first pivoting parts 24 and the lower row of the second pivoting parts 34 are aligned. A quantity of the upper row of the first pivoting parts 24 is two, and a quantity of the upper row of the second pivoting parts 34 is two. A quantity of the lower row of the first pivoting parts 24 is two, and a quantity of the lower row of the second pivoting parts 34 is two. The upper row of the first pivoting parts 24 and the upper row of the second pivoting parts 34 are mounted around one slide rail 12, and the lower row of the first pivoting parts 24 and the lower row of the second pivoting parts 34 are mounted around the other slide rail 12.

Referring to FIG. 2, the cover 103 is covered to the eyes of the user. The cover 103 has a pair of accommodating holes 1031. The first display unit 105 and the second display unit 106 are accommodated in the pair of the accommodating holes 1031. The cover 103 further includes a pad 1032. The pad 1032 is disposed close to a face of the user. The pad 1032 is made of silicone, rubber, foam or other soft materials. The pad 1032 is attached around the eyes of the user, so when the user wears the head-mounted display 10, a comfort level of wearing the head-mounted display 10 is improved.

Referring to FIG. 2 to FIG. 10, the first sliding plate 2 has a first base 25 and a first covering plate 26. A lower portion of a rear surface of the first sliding plate 2 extends rearward and then extends upward to form the first base 25. The first display unit 105 is installed in the first base 25, and the first display unit 105 moves with the first sliding plate 2. The first covering plate 26 is covered to an outer surface of the first base 25, and the first covering plate 26 moves with the first sliding plate 2.

The second sliding plate 3 has a second base 35 and a second covering plate 36. A lower portion of a rear surface of the second sliding plate 3 extends rearward and then extends upward to form the second base 35. The second display unit 106 is installed in the second base 35, and the second display unit 106 moves with the second sliding plate 3. The second covering plate 36 is covered to an outer surface of the second base 35, and the second covering plate 36 moves with the second sliding plate 3.

The cover 103 of the housing 101 is equipped with two baffles 1033. A middle of each baffle 1033 opens freely. Insides of the two baffles 1033 are communicated with an inside of the cover 103. Two inner surfaces of two side walls of the cover 103 protrude inward to form the two baffles 1033, respectively. Inner surfaces of the two baffles 1033 and the inner surfaces of the two side walls of the cover 103 together surround a hollow section 1034. The first base 25 and the second base 35 are positioned between the two baffles 1033, and the first base 25 and the second base 35 move within the hollow section 1034. When the first base 25 and the second base 35 approach each other, the first covering plate 26 and the second covering plate 36 move away from the two baffles 1033, respectively.

Conversely, when the first base 25 and the second base 35 move apart from each other, the first covering plate 26 and the second covering plate 36 move towards the two baffles 1033, respectively, and the first covering plate 26 and the second covering plate 36 project into the two baffles 1033. The first covering plate 26 and the second covering plate 36 prevent the first base 25 and the second base 35 from being directly exposed inside the cover 103, so that the first sliding plate 2 and the second sliding plate 3 are prevented from being collided by an external force to be damaged.

As described above, the head-mounted display 10 is equipped with the interpupillary distance adjustment device 100 which includes the first sliding plate 2 and the second sliding plate 3 slidably disposed at the bracket 1, respectively, and the first display unit 105 and the second display unit 106 are respectively installed to the first sliding plate 2 and the second sliding plate 3, respectively. Furthermore, the first sliding plate 2 has the first rack 22, and the second sliding plate 3 has the second rack 32, the first rack 22 and the second rack 32 are parallel to each other, and the first rack 22 and the second rack 32 are engaged with the adjustment gear 4 which is mounted to the bracket 1, the adjusting lever 23 is stirred to generate the rotation of the adjustment gear 4, so that the first rack 22 and the second rack 32 are driven to move closer to each other or break away from each other, and the first sliding plate 2 and the second sliding plate 3 move closer to each other or break away from each other, in this way, the distance between the first display unit 105 and the second display unit 106 is adjusted according to the interpupillary distance of the user, and a better visual effect is provided for the user. Additionally, the limiting block 54 is blocked in the one of the plurality of the limiting grooves 234 to prevent a displacement of the first sliding plate 2 and the second sliding plate 3 to enhance a wearing stability of the head-mounted display 10, so the head-mounted display 10 has an excellent wearing stability.

What is claimed is:

1. A head-mounted display, comprising:
a housing, an inside of the housing having a receiving space penetrating through a rear of the housing;
a bracket disposed in the receiving space;
a first sliding plate slidably disposed to one side of the bracket, the first sliding plate having a first rack extended sideward from one side of the first sliding plate, several portions of a surface of the first sliding plate being recessed inward to form a plurality of limiting grooves abreast arranged transversely;
a first display unit mounted on the first sliding plate, and the first display unit moving together with the first sliding plate;
a second sliding plate slidably disposed to the other side of the bracket, and the second sliding plate being located to one side of the first sliding plate, the second sliding plate having a second rack extended sideward and towards the first sliding plate from one side of the second sliding plate, the first rack and the second rack being parallel to each other;

a second display unit mounted on the second sliding plate, and the second display unit moving together with the second sliding plate;
an adjustment gear rotatably disposed at the bracket, and the adjustment gear being connected between the first sliding plate and the second sliding plate, the first rack and the second rack being both engaged with the adjustment gear; and
a limiting elasticity piece mounted to an inner surface of the housing, the plurality of the limiting grooves facing the limiting elasticity piece, a middle of the limiting elasticity piece being arched towards the first sliding plate to form a limiting block, and the limiting block being buckled in one of the plurality of the limiting grooves.

2. The head-mounted display as claimed in claim 1, wherein the limiting elasticity piece includes an elastic cantilever and a pair of fixing legs, two outer sides of the elastic cantilever are perpendicularly bent towards the inner surface of the housing and then extend outward to form the pair of the fixing legs, the pair of the fixing legs are combined with the inner surface of the housing to hang the elastic cantilever beside the inner surface of the housing, a middle of the elastic cantilever is bulged away from the inner surface of the housing to form the limiting block.

3. The head-mounted display as claimed in claim 2, wherein two portions of the inner surface of the housing extend inward to form a pair of fixing parts, the limiting elasticity piece includes a pair of fixing holes longitudinally penetrating through the pair of the fixing legs, respectively, the pair of the fixing parts pass through the pair of the fixing holes, and the pair of the fixing legs are combined with the pair of the fixing parts.

4. The head-mounted display as claimed in claim 3, wherein the inner surface of the housing extends inward to form a rib, two inner surfaces of two opposite sides of the rib extend inward to form the pair of the fixing parts.

5. The head-mounted display as claimed in claim 1, wherein a front surface of the first sliding plate extends frontward to form a limiting part, the limiting elasticity piece is aligned with the limiting part, several portions of a front surface of the limiting part are recessed inward to form the plurality of the limiting grooves arranged side by side.

6. The head-mounted display as claimed in claim 5, wherein a top wall of the housing defines an adjusting groove penetrating through the top wall of the housing along an up-down direction, a top of the first sliding plate extends towards the adjusting groove to form an extension plate, a top end of the extension plate extends upward and expands outward to form a sliding portion, a width of the sliding portion is greater than a width of the adjusting groove, the sliding portion is positioned outside the adjusting groove, the limiting part is extended frontward from a front surface of the extension plate.

7. The head-mounted display as claimed in claim 1, wherein the bracket includes a gear seat and a locking element, the gear seat is located between the first sliding plate and the second sliding plate, a rear surface of the bracket protrudes outward to form the gear seat, the gear seat is a hollow shaft structure, a center of the adjustment gear has a through hole longitudinally penetrating through the adjustment gear, the gear seat passes through the through hole, the locking element passes through the through hole, and the locking element is locked into the gear seat.

8. The head-mounted display as claimed in claim 1, wherein an inner wall of the first sliding plate extends sideward and towards the second sliding plate to form a first adjustment belt, a bottom of the first adjustment belt protrudes downward to form the first rack, an inner wall of the second sliding plate extends sideward and towards the first sliding plate to form a second adjustment belt, a top of the second adjustment belt protrudes upward to form the second rack.

9. The head-mounted display as claimed in claim 1, wherein the bracket includes two parallel slide rails and a plurality of slide rail seats, the plurality of the slide rail seats are protruded outwardly from a rear surface of the bracket, the plurality of the slide rail seats are formed as semicylindrical structures, insides of the plurality of the slide rail seats define a plurality of penetrating holes, the two slide rails are fastened to the plurality of the slide rail seats, the two slide rails pass through the penetrating holes of the plurality of the slide rail seats.

10. The head-mounted display as claimed in claim 9, wherein several portions of a front surface of the first sliding plate protrude frontward to form a plurality of first pivoting parts, and several portions of a front surface of the second sliding plate protrude frontward to form a plurality of second pivoting parts, each first pivoting part and each second pivoting part are designed as arcuation structures, insides of the plurality of the first pivoting parts and the second pivoting parts define a plurality of perforations transversely penetrating through the plurality of the first pivoting parts and the second pivoting parts, so that the plurality of the first pivoting parts and the second pivoting parts are mounted around the two slide rails.

11. The head-mounted display as claimed in claim 1, wherein the housing includes a casing, and a cover combined with the casing, the cover has a pair of accommodating holes, two inner surfaces of two side walls of the cover protrude inward to form two baffles, respectively, a lower portion of a rear surface of the first sliding plate extends rearward and then extends upward to form a first base, a lower portion of a rear surface of the second sliding plate extends rearward and then extends upward to form a second base, the first display unit is installed in the first base, the second display unit is installed in the second base, the first display unit and the second display unit are accommodated in the pair of the accommodating holes, the first base and the second base are positioned between the two baffles.

12. The head-mounted display as claimed in claim 11, wherein the first sliding plate has a first covering plate, the first covering plate is covered to an outer surface of the first base, the second sliding plate has a second covering plate, the second covering plate is covered to an outer surface of the second base.

13. A head-mounted display, comprising:
a housing having a receiving space;
a bracket disposed in the receiving space;
a first sliding plate slidably disposed to one side of the bracket, the first sliding plate having a first rack;
a first display unit mounted to the first sliding plate, and the first display unit moving together with the first sliding plate;

a second sliding plate slidably disposed to the other side of the bracket, the second sliding plate having a second rack, the first rack and the second rack being parallel to each other;
a second display unit mounted to the second sliding plate, and the second display unit moving together with the second sliding plate; and
an adjustment gear rotatably disposed at the bracket, and the adjustment gear being connected between the first rack and the second rack;
wherein a plurality of limiting grooves are formed on one of the first sliding plate and the second sliding plate;
wherein a limiting elasticity piece is mounted to the housing, the plurality of the limiting grooves face the limiting elasticity piece, the limiting elasticity piece has a limiting block, and the limiting block is buckled in one of the plurality of the limiting grooves; and
wherein the adjustment gear rotates to drive the first rack and the second rack to move closer to each other or break away from each other, so that the first sliding plate and the second sliding plate move closer to each other or break away from each other.

14. A head-mounted display, comprising:
a housing having a receiving space, a top wall of the housing defining an adjusting groove, the receiving space being communicated with the adjusting groove;
a bracket disposed in the receiving space;
a first sliding plate slidably disposed to one side of the bracket, the first sliding plate having a first rack;
a first display unit mounted on the first sliding plate, and the first display unit moving together with the first sliding plate;
a second sliding plate slidably disposed to the other side of the bracket, the second sliding plate having a second rack, the first rack and the second rack being parallel to each other;
a second display unit mounted on the second sliding plate, and the second display unit moving together with the second sliding plate; and
an adjustment gear rotatably disposed at the bracket, and the adjustment gear being connected between the first rack and the second rack;
wherein an adjusting lever is extended from one of the first sliding plate and the second sliding plate, and the adjusting lever passes through the adjusting groove, and the adjusting lever is exposed to a top surface of the housing;
wherein a fixation structure is positioned between the housing and one of the first sliding plate and the second sliding plate; and
wherein the fixation structure has a plurality of limiting grooves and a limiting elasticity piece, the plurality of the limiting grooves face the limiting elasticity piece, the limiting elasticity piece has a limiting block, and the limiting block is buckled in one of the plurality of the limiting grooves.

* * * * *